United States Patent [19]

Hullender et al.

[11] Patent Number: 6,111,985
[45] Date of Patent: Aug. 29, 2000

[54] METHOD AND MECHANISM FOR PROVIDING PARTIAL RESULTS IN FULL CONTEXT HANDWRITING RECOGNITION

[75] Inventors: Gregory N. Hullender, Kirkland; Patrick M. Haluptzok, Redmond, both of Wash.

[73] Assignee: Microsoft Corporation, Redmond, Wash.

[21] Appl. No.: 08/870,558

[22] Filed: Jun. 6, 1997

[51] Int. Cl.[7] .................................................. G06K 9/72
[52] U.S. Cl. ......................................... 382/229; 382/187
[58] Field of Search .................................. 382/229, 227, 382/226, 187, 188, 189, 230, 231

[56] References Cited

U.S. PATENT DOCUMENTS

| | | | |
|---|---|---|---|
| 4,589,142 | 5/1986 | Bednar .................................... | 382/226 |
| 4,876,731 | 10/1989 | Loris et al. ............................ | 382/229 |
| 5,067,165 | 11/1991 | Nishida ................................... | 382/195 |
| 5,151,950 | 9/1992 | Hullender ............................... | 382/13 |
| 5,321,773 | 6/1994 | Kopec et al. ........................... | 382/209 |
| 5,377,281 | 12/1994 | Ballard et al. .......................... | 382/229 |
| 5,392,363 | 2/1995 | Fujisaki et al. ......................... | 382/13 |
| 5,526,444 | 6/1996 | Kopec et al. ........................... | 382/233 |
| 5,615,286 | 3/1997 | Patel ....................................... | 382/224 |
| 5,742,705 | 4/1998 | Partasarathy .......................... | 382/185 |

OTHER PUBLICATIONS

Burges et al., "Recognition of Handwritten Cursive Postal Words Using Neural Networks," USPS Advanced Technol Conference, (Nov. 30–Dec. 2, 1992).

Burges et al., "Shortest Path Segmentation: A Method for Training a Neural Network to Recognize Character Strings," IJCNN '92 Conference Proceedings, vol. 3, pp. 165–171 (1992).

Rumelhart, David E., "Theory to Practice: A Case Study—Recognizing Cursive Handwriting," *Computational Leaning & Cognition*, Proceedings of the Third NEC Research Symposium, Chapter 8, pp. 177–196 (1992).

Forney Jr., G. David, "The Viterbi Algorithm," Proceedings of the IEEE, vol. 61, No. 3 (Mar. 1973) pp. 268–278.

*Primary Examiner*—Amelia Au
*Assistant Examiner*—Martin E. Miller
*Attorney, Agent, or Firm*—Michalik & Wylie, PLLC

[57] ABSTRACT

A method and mechanism for displaying partial results of full context handwriting recognition. As handwritten characters are entered into a system, a shape matcher associates the character with a plurality of alternate code points, with each alternate code point having probability information associated therewith. The alternate code points are placed at the end of a queue, and a cost is determined from each alternate code point to any immediately preceding alternate in the queue. The cost is based on the probability information of the alternates and a transition cost therebetween. Then, the lowest cost path back from each of the alternates at the end of the queue to an alternate at the beginning of the queue is determined. If each lowest cost path back converges to a common alternate in the queue, the common alternate and any previous alternates on the path back are recognized as the code points for each of the handwritten characters associated therewith. Because further context cannot affect change the value of these code points, the alternates corresponding to these code points are removed from the queue, and the code points appropriately displayed on a screen as recognized characters, to allow editing thereof. The ability to provide partial results with no loss of accuracy may be extended to include the case where the language model is an arbitrarily complex non-determinsitic state machine including the case where the state machine may be generated from a dictionary.

35 Claims, 15 Drawing Sheets

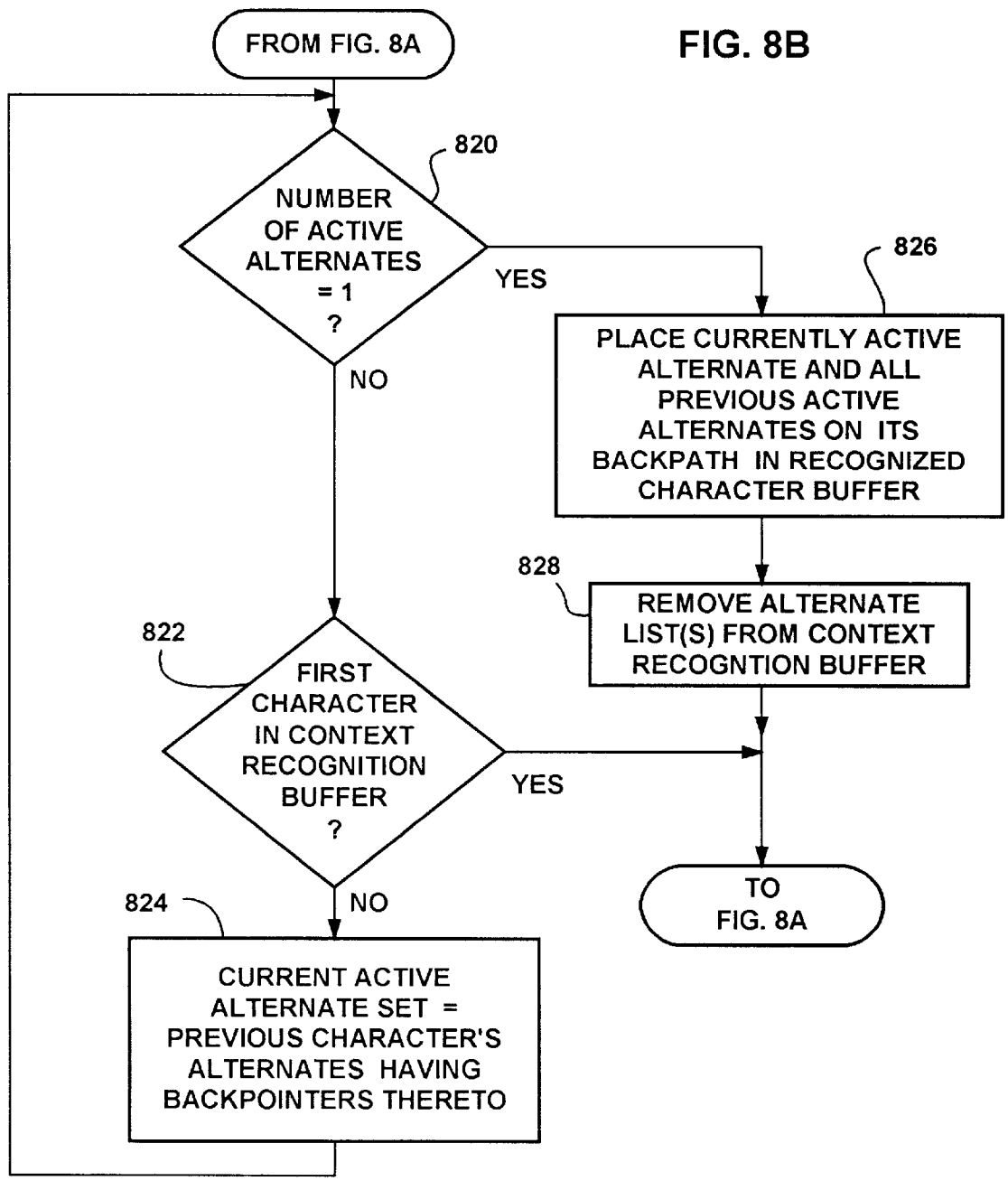

METHOD AND MECHANISM FOR PROVIDING PARTIAL RESULTS IN FULL CONTEXT HANDWRITING RECOGNITION

FIELD OF THE INVENTION

The invention relates generally to the input of user information into computer systems, and more particularly to the recognition of handwritten characters input by a user.

BACKGROUND OF THE INVENTION

Many handwritten characters resemble others, for example, a handwritten lowercase letter "o" resembles a "0" (zero) as well as an uppercase "O." Moreover, the shape of any handwritten character typically varies from user to user, and often varies from instance to instance when written by a single user. Consequently, in addition to shape matching, the accuracy of handwritten character recognition is improved when the character is also analyzed with respect to its context. Indeed, some Japanese symbols are virtually indistinguishable from one another absent surrounding context.

Context-based recognition is done in one of two ways, i.e., a backward context approach or a full context approach. Backward context recognition analyzes previous characters, if any, to determine the best translation of the current character. A benefit of backward context recognition is that each entered character is recognized and immediately displayed for user verification. In contrast, a full context approach looks at the characters both before and after each character in a string to help in the recognition thereof.

Backward context recognition is less accurate than full context recognition because by only looking backwards, only half of the available context is used. By way of example, a handwritten string such as "100" may be intended to be "one-zero-zero" or the first three letters of a word such as "loops." As can be appreciated, both are reasonably probable. If the next character was available for analysis, the chance of correctly recognizing the string may be greatly improved. For example, a "5" would strongly indicate that the first three characters were part of a number ("1005") while a "p" would strongly indicate the first three characters were part of a word ("loop"). However, the backwards context recognition has to make its initial decision based solely on the first character, which may be incorrect, particularly if the character shape is one which closely resembles the shape of one or more other characters. Thereafter, subsequent characters are analyzed relative to this initial guess, e.g., a letter more likely follows a letter than a number. As can be appreciated, if the initial guess is incorrect, with backwards context recognition, some or all subsequent characters may be also incorrect, further compounding the error.

Full (forwards and backwards) context recognition is thus more accurate than backwards recognition because of the ability to use all rather than half of the available context information. A first approach to full context recognition is to wait for the user to complete all characters in a given string (with the user indicating completion) and then analyze the full string. Full context thus provides a relatively high level of recognition accuracy, but also has a number of drawbacks associated therewith. First, the user receives no feedback while entering the characters until the user indicates that the string is complete. Second, there is a noticeably long delay between receipt of the string and the completion of the recognition operation. Lastly, and possibly most important, the memory requirements for keeping a potentially unlimited amount of electronic ink in the memory for a potentially unlimited amount of characters would overwhelm many systems, particularly hand-held (palmtop) computing devices in which handwriting recognition is commonplace.

A compromise solution has been attempted in which backwards context recognition is initially performed to provide instantaneous feedback using only small amounts of memory, while full context recognition is later performed on those backwards-recognized characters to increase recognition accuracy. However, this solution has the effect of changing characters that have already been displayed, and possibly verified as correct by the user, to character values that may be incorrect. Indeed, in most cases, unilaterally changing a character after display and verification of the correctness thereof has been found so annoying to users that this is an unacceptable solution, even though overall recognition accuracy may be increased.

OBJECTS AND SUMMARY OF THE INVENTION

Accordingly, it is a general object of the present invention to provide an improved method and mechanism for performing full-context recognition.

Another object is to provide a full context recognition method and mechanism that facilitates rapid visual feedback while having relatively low memory requirements.

In accomplishing those objects, it is a related object to provide a method and mechanism as characterized above that functions with existing recognition components such as shape matching components and language model context components.

Yet another object is to provide a method and mechanism of the above kind that is fast, reliable, cost-efficient, flexible and extensible.

Briefly, the present invention provides a method and mechanism for recognizing handwritten characters previously entered into the system from the context of subsequent handwritten characters presently being entered into the system. Using a shape matcher, each handwritten character entered is associated with a plurality of alternate code points therefor, with each alternate code point having probability information associated therewith. As each character is received, the alternate code points therefor are placed at the end of a queue, and a cost is determined from each alternate code point to any immediately preceding alternate in the queue. The cost is based on the probability information of the alternates and a transition cost therebetween. Then, the lowest cost path back from each of the alternates at the end of the queue to an alternate at the beginning of the queue is determined. If each lowest cost path back converges at (traverses) a common alternate in the queue, the common alternate and any alternates previous thereto on the path back are recognized as the code points for each of the handwritten characters associated therewith. The alternates corresponding to recognized code points are removed from the queue, and the code points appropriately displayed on a screen as recognized characters, to allow editing thereof or the like.

Other objects and advantages will become apparent from the following detailed description when taken in conjunction with the drawings, in which:

BRIEF DESCRIPTION OF THE DRAWINGS

FIGS. 8A–8B comprise a flow diagram representing the general steps taken to perform full context recognition while displaying partial results in accordance with one aspect of the present invention;

DETAILED DESCRIPTION OF THE PREFERRED EMBODIMENT

Figure 1:
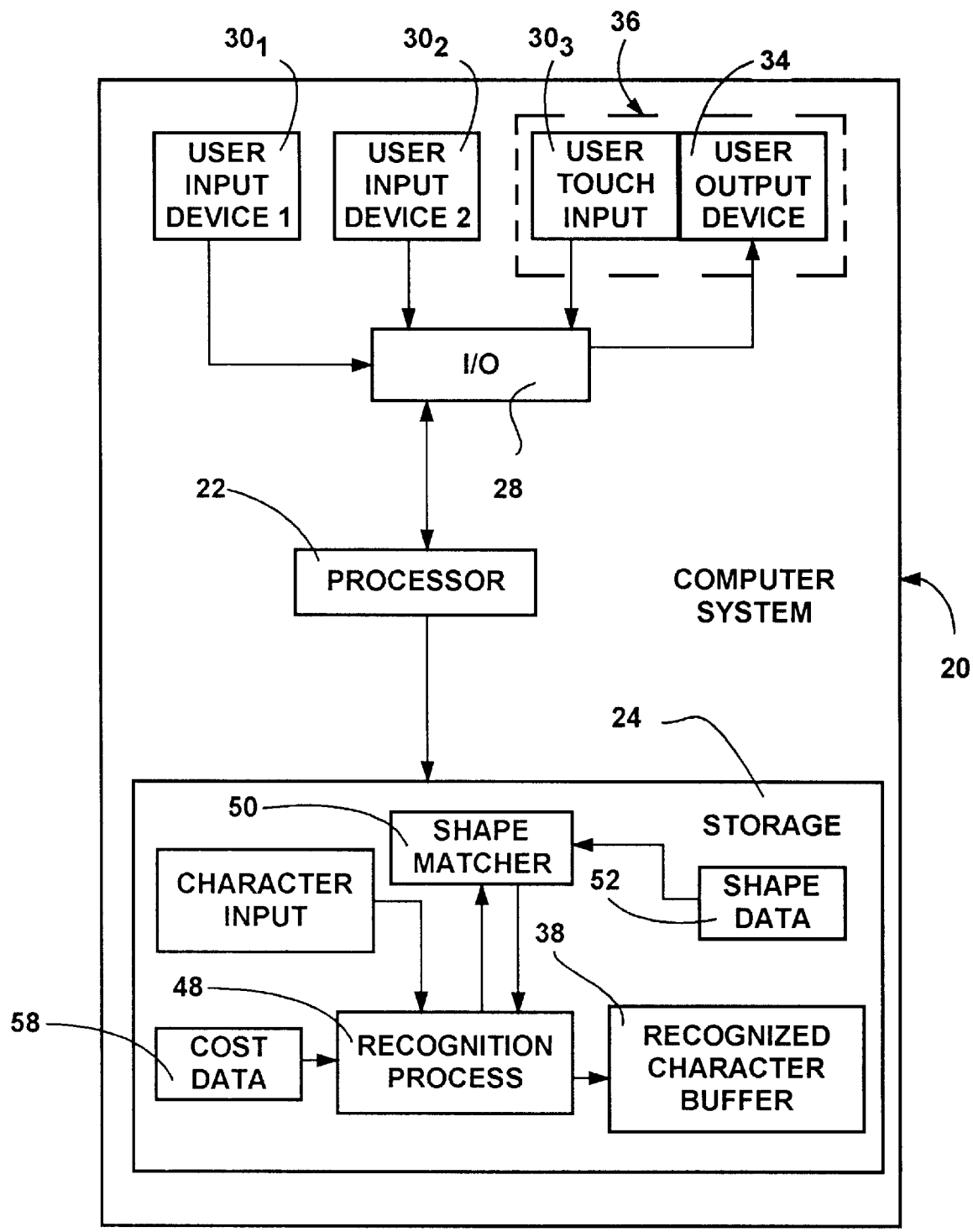
FIG. 1 is a block diagram representing a computer system into which the present invention may be incorporated.

Turning to the drawings and referring first to FIG. 1, there is shown a computer system generally designated 20 into which the present invention may be incorporated. The computer system 20 includes a processor 22 operatively connected to storage 24, the storage including read only memory (ROM), random access memory (RAM) and non-volatile storage such as a hard disk-drive, optical drive or the like. As can be appreciated, the non-volatile storage can be used in conjunction with the RAM to provide a relatively large amount of virtual memory via well-known swapping techniques.

The processor 22 also connects through I/O circuitry 28 to one or more input devices $30_1$–$30_3$, such as a keyboard and/or a pointing device such as a mouse. The system 20 includes means for inputting pen-based information, including handwritten characters, such as a pen and/or pen-sensitive (e.g., touch-sensitive) input device $30_3$. The system 20 also includes at least one local output device 34 connected to the I/O circuitry 28 for communicating information, such as via a graphical user interface, to the user of the system 20. The output device 34 may include a liquid crystal display screen or the like integrated with the pen-input device $30_3$, which, taken together, can be considered a pen-sensitive screen 36 (FIG. 2).

A preferred system 20 is a hand-held personal computing device running on the Windows CE operating system loaded in the storage 24. At least one application program such as a word processing program may also be loaded into the storage 24.

Figure 2:
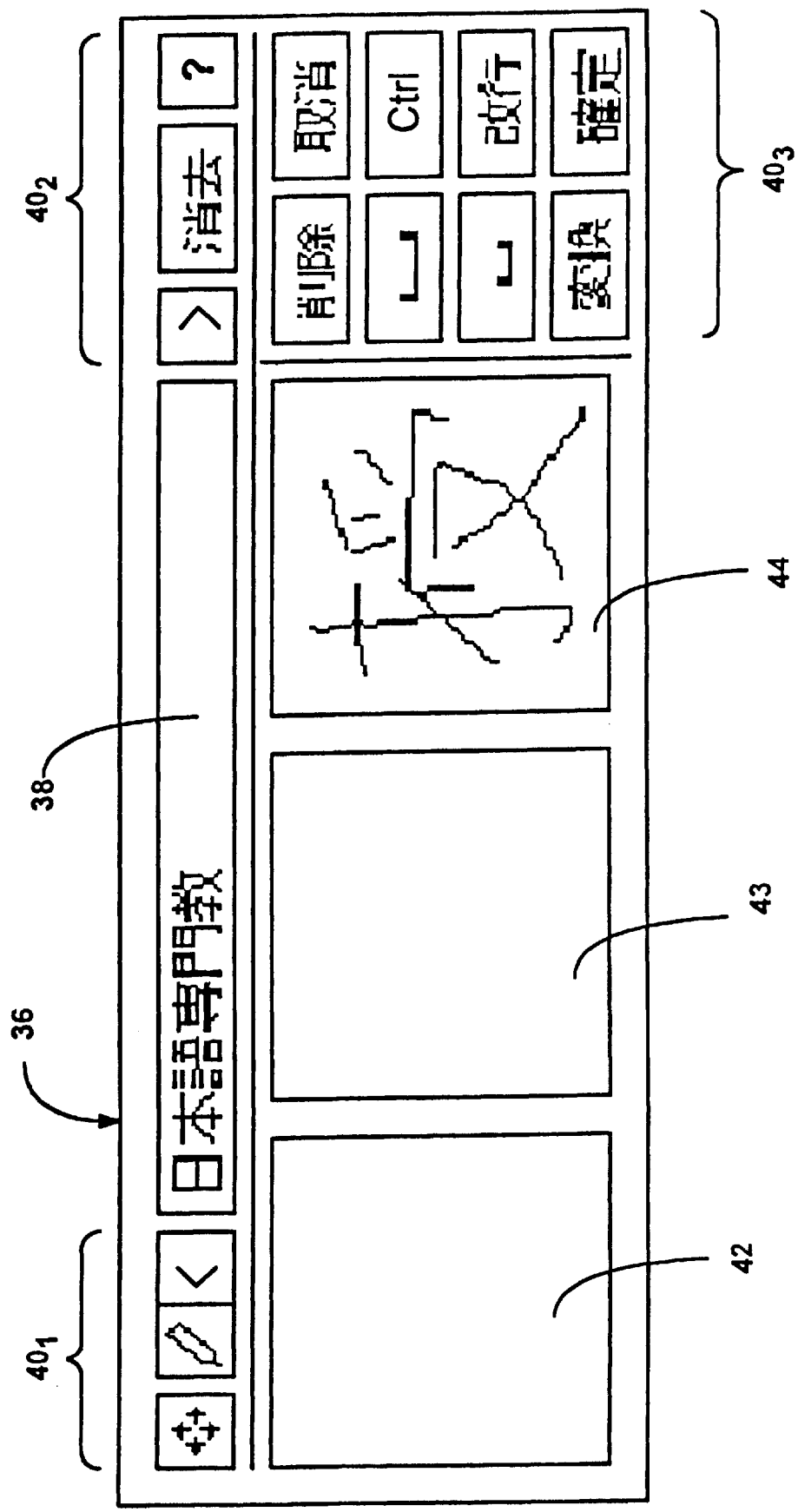
FIG. 2 is a representation of an exemplary touch-sensitive screen for inputting user information to the system and for outputting system information to the user.

As shown in FIG. 2, the pen-sensitive screen 36 includes a visible manifestation of a text buffer 38 for displaying and allowing edit control of the text characters that have been input into and recognized by the system 20. As described in detail below, if the character is a handwritten character, the system 20 recognizes the character in part by its shape, from among a set of possible computer characters, (e.g., ASCII or Unicode code points). The system 20 also recognizes the character in part from its full context, i.e., its surrounding characters both forward and backward. In accordance with one aspect of the invention and as described in detail below, the code point is transferred to the text buffer 38, i.e., recognized character buffer 38, and displayed therein in an appropriate font and font size, when it is established that the additional context cannot change the code point regardless of further character input.

The touch screen 36 preferably includes one or more button input areas $40_1$–$40_3$ (FIG. 2), which may provide a virtual keyboard through which the user may directly input characters, character-based editing commands and so on. For example, the buttons may represent characters, such that when contacted by a pen, the character is input into the system as if it was typed by the user on a conventional keyboard. In addition, the user may use such buttons to enter editing commands, such as BackSpace or Enter commands, by touching the screen 36 at an appropriately displayed button in the one of the areas $40_1$–$40_3$.

As shown in FIG. 2, for inputting handwritten characters, the display/touch-sensitive screen 36 typically includes two or more pen input display areas 42–44. In general, the pen input display areas 42–44 are used to receive handwritten characters from the user in the form of strokes. The user typically alternates character input between the boxes 42–44. For example, a user will write in the first box 42, with the system echoing the pen movement on the screen by darkening or coloring the contacted areas, giving the user the impression that the pen has ink therein. When the user begins writing in the second box 43, it is assumed that the character in the first box 42 is complete. The stroke information from the first box 42 is thus sent to a recognition process 48, and the displayed strokes (ink) in the first box 42 are erased. Note that the recognizer runs on a separate thread whereby it can recognize a character while the user is writing the next character. Similarly, the same actions occur in the second box 43, i.e., the strokes are sent for character recognition thereof and the second box 43 erased upon a detection that the user is now writing in the third box 44 (or has returned to write in the first box 42). A time-out when no pen activity is detected is also treated as a completed character, as will a direct command from the user, entered via one of the button input areas $40_1$–$40_3$ or the like, indicating that the user is finished with a character.

Figure 3:
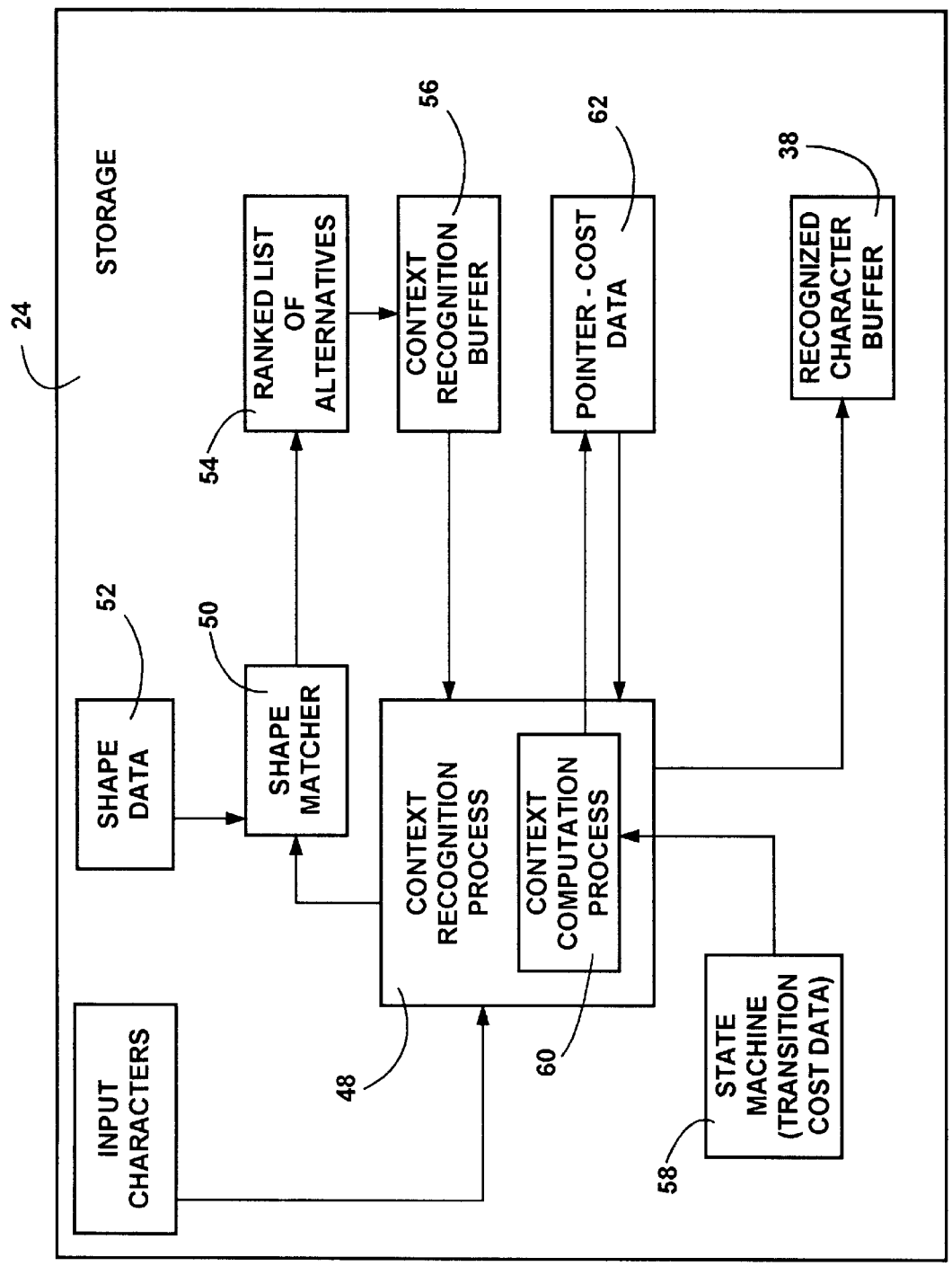
FIG. 3 is a block diagram representing functional components for recognizing handwritten characters according to the present invention.

In accordance with one aspect of the invention and as best shown in FIG. 3, when the user inputs a character, the recognition process 48 receives the character and sends the character data (e.g., the stroke or bitmap information) to a shape matcher 50. The shape matcher 50 compares the character data against shape data 52 maintained in the storage 24. The shape data 52 may be organized in one or more databases containing character shape information accumulated from samples taken from thousands or even millions of users.

Figure 4A:
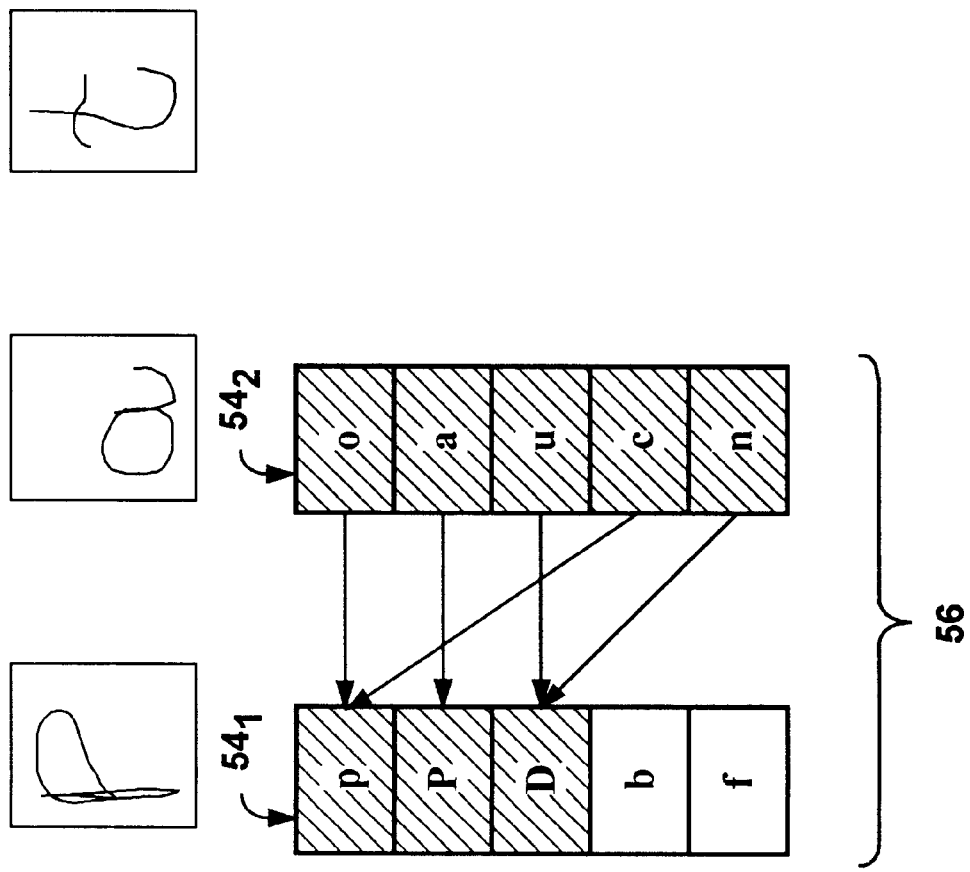
FIGS. 4A–4C represent an exemplary sequence of handwritten user characters with corresponding character alternatives returned by a shape matcher and buffered and analyzed for context recognition thereof.

In keeping with the invention, the shape matcher 50 returns a list of possible alternates 54 (i.e., possible code points) for the character, each alternate having a probability (or some other weighted value) associated therewith indicative of the likelihood of the user-entered character's match with the sample data. For example, the leftmost part of FIG. 4A shows one such (hypothetical) ranked list 54, of five alternates for the handwritten character (intended by the user to be a capital "P") input via one of the boxes 42–44. Based upon the actual shape versus the sample shape data 52, as determined by the shape matcher 50, the lowercase "p" may have fifty percent chance (likelihood) of being what the user intended, the uppercase "P" a forty-eight percent chance, the "D" a one percent chance, and so on totaling (or closely approaching) one hundred percent. Note that in the actual system, the shape matcher 50 may return in the list 54 any number of alternative characters, or a fixed number of alternates such as the most-probable twenty. Moreover, instead of a percentage, the preferred shape matcher 50 returns a cost proportional to how unlikely each alternative is. The cost equals the negative of the natural log of the percentage probability, to determine the lowest cost path as described below. Negative natural logs are used since some of the probabilities can be very small percentages, and since summing the costs (performed by a known algorithm) corresponds to multiplying the percentages.

Once the shape matcher 50 has returned the ranked list of character alternatives 54, the recognition process 48 appends the list 54 to a context recognition buffer 56 or the like containing similar ranked lists for any preceding characters, if any, which have not yet been recognized. In accordance with another aspect of the invention, each of the alternates of the preceding character has a cost associated with transitioning to each of the alternates of the most recent character. As can be appreciated, this forms a lattice of possible paths (e.g., FIG. 7) between the most recent character's alternates and the previous character's alternates. A state machine 58, statistically derived from a language model or some other source and kept in the storage 24, maintains information needed to determine the costs of transitioning from each alternative of the last-written character to each of the alternatives of the preceding character.

The recognition process 48 then uses a context computation process 60 to compute the total cost to reach each of the character alternatives of the last written character. A preferred context computation process uses an algorithm described in the paper entitled "*The Viterbi Algorithm,*" G. David Forney Jr., Proceedings of the IEEE, VOL 61, No. 3, (1973). The Viterbi algorithm is known in the character recognition art and is thus not described in detail herein, except to summarize that the algorithm finds the lowest cost path from among a lattice of possible paths between nodes, wherein each node has a cost associated therewith and each branch between any two nodes has a cost associated therewith.

Figure 4B:
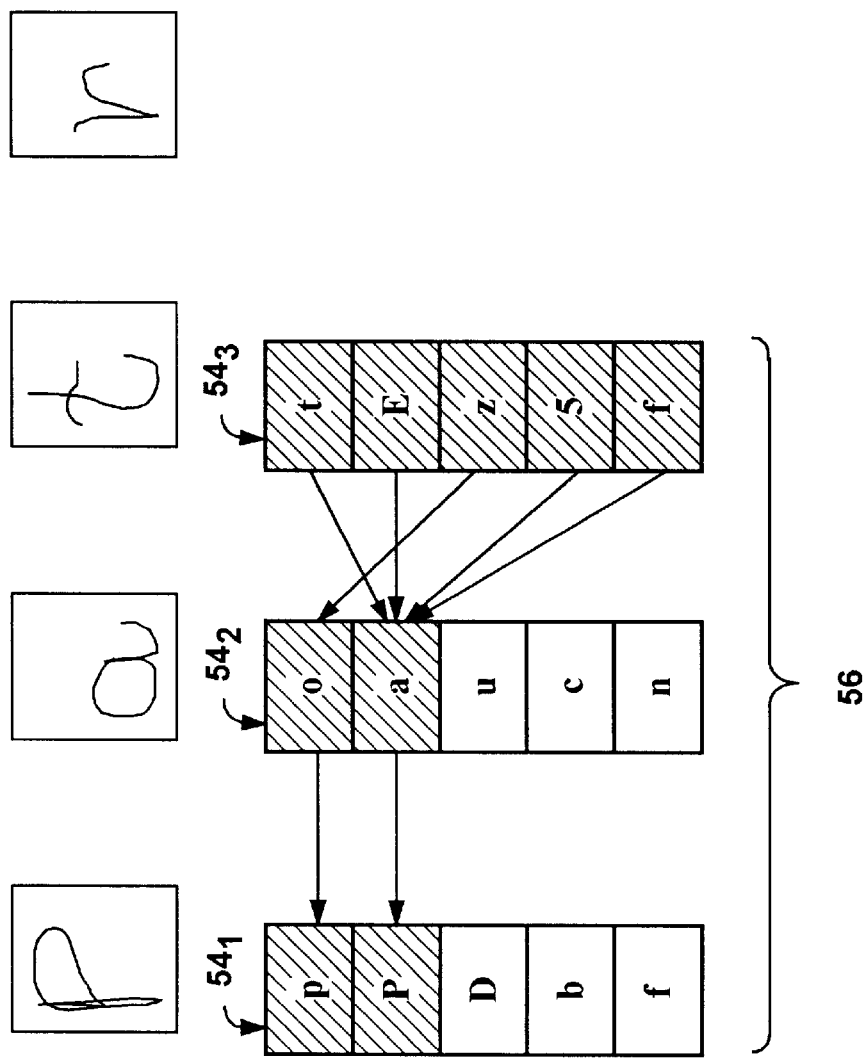
Figure 4C:
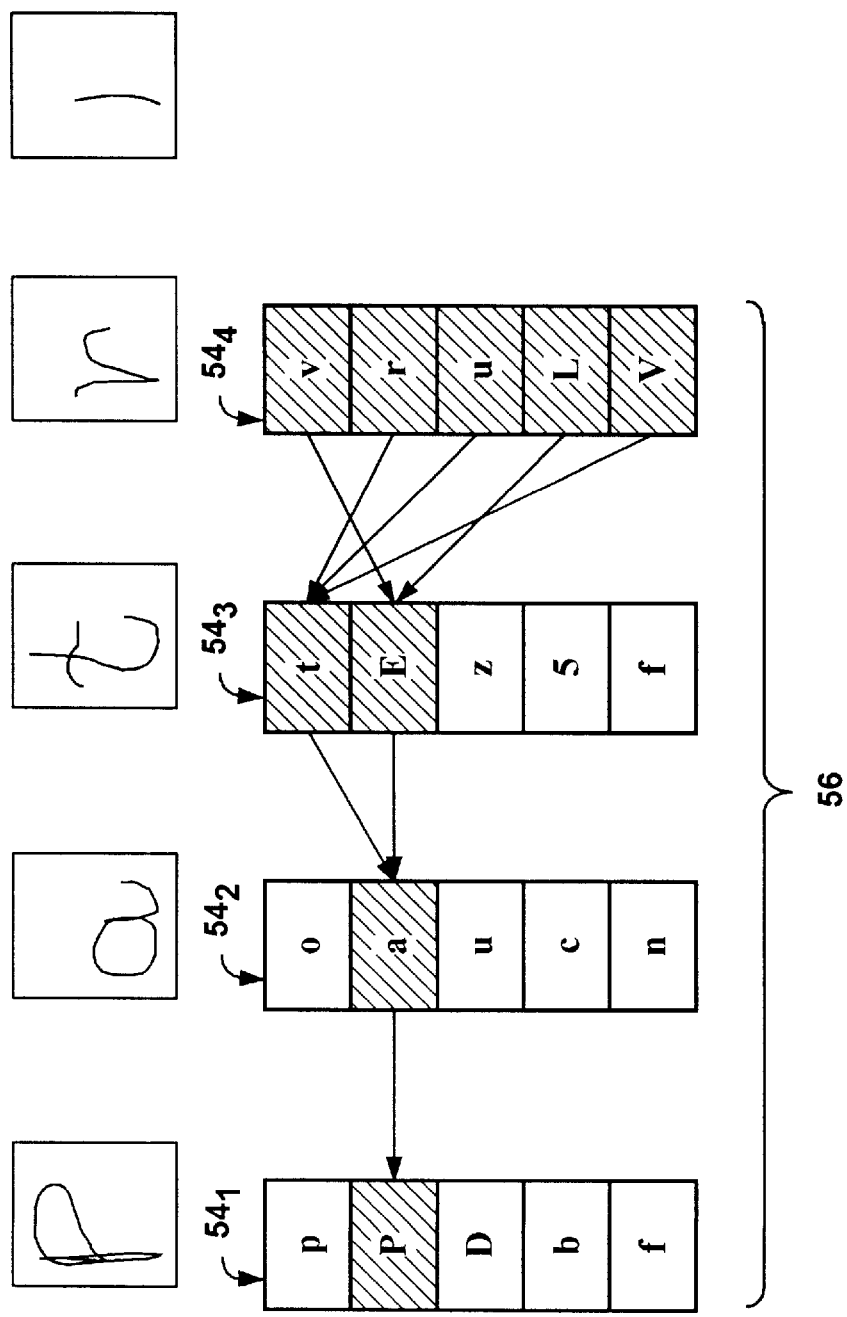

Thus, as shown in FIGS. 4A–4C, as each character is written, the cost of each path, including the cost of the alternates and the transition cost, are computed for each path. The lowest cost path to get to each of the last-written character's alternates are saved along with the cost. More particularly, a backpointer from each of the last-written alternates pointing on the lowest cost backpath to a predecessor alternate is saved, along with the cost, in a pointer-cost data table 62 or the like for use by the recognition process 48 as described below.

By way of example, FIG. 4A shows five alternates in a list 54₂ within the context recognition buffer 56 for the second box, intended by the user to be a lowercase "a" character. Each of the alternates in the list 54₂ have a cost to get from the alternates in the list 54₁ thereto. The lowest of these costs are saved as a backpointer, shown as an arrow in FIGS. 4A–4C. Note that the various characters and paths shown in this example are only for the purposes of providing a conceptual illustration, and are not necessarily derivable from any real data. Thus, in this example, the lowest cost path to get to the lowercase "o" character in the list 54₂ is from the lowercase "p" alternate in box 54₁, the "a" in 54₂ to the capital "P" in 54₁ and so on. As shown in FIG. 4A, backpointers are stored for each of these lowest cost paths. As can be appreciated, in a typical case, not all of the previous character's alternates (e.g., the "b" and "f" in the list 54₁ of FIG. 4A) have a backpointer thereto, since they are not on any of the last-written alternates' lowest cost paths. Conversely, those alternates that do have backpointers pointing thereto (shown as shaded in FIGS. 4A–4C) are considered to be active.

As characters are added, such as shown in FIGS. 4B–4C, the process is repeated. The backpointers are only saved for previous alternates that are active, since only active alternates can be on the lowest cost path back. Thus, as shown in FIG. 4B, the "t"-shaped character's alternates in the list 54₃ all point to either the "o" or the "a" alternates in the list 54₂, and thus the backpointers from the "u," "c" and "n" characters are no longer active. Similarly, as shown in FIG. 4C, all of the alternates in the list 54₄ corresponding to the fourth box have backpointers to either the "t" or "E" of the third box's list 54₃.

In accordance with one aspect of the invention, when the backpointers converge to one active alternate in given list of alternates, that alternate and any of its preceding alternates on the path back therefrom are considered to be recognized. Those alternates are then placed as code points in the recognized character (text) buffer 38 for displaying to the user, and the lists containing those alternates removed from the context recognition buffer 56. This is possible because further context, no matter what characters are entered, will not change this convergence. Thus, in the example shown in FIG. 4C, a "Pa" will be placed in the recognized character buffer 38 and the lists 54₁ and 54₂ removed from the context recognition buffer 56.

Figure 5A:
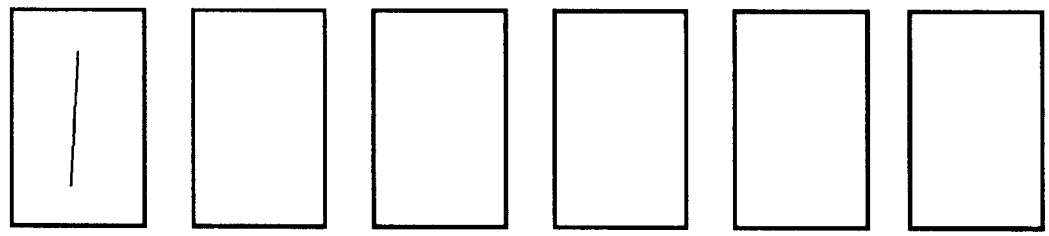
FIGS. 5A–5F represent an alternate exemplary sequence of handwritten user characters with corresponding character alternatives returned by a shape matcher and buffered and analyzed for context recognition.
Figure 5B:
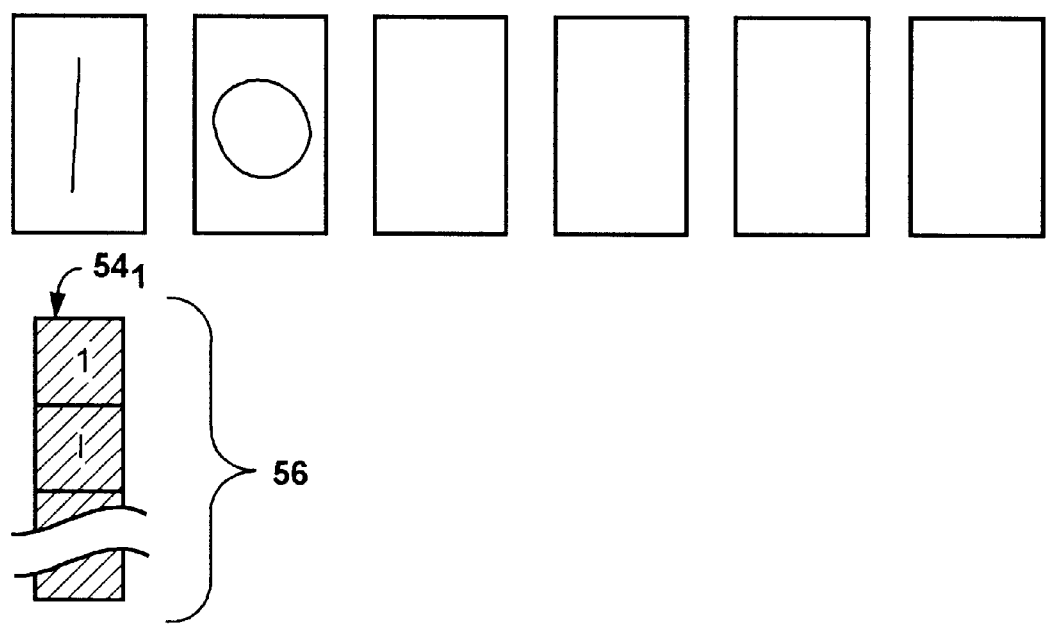
Figure 5C:
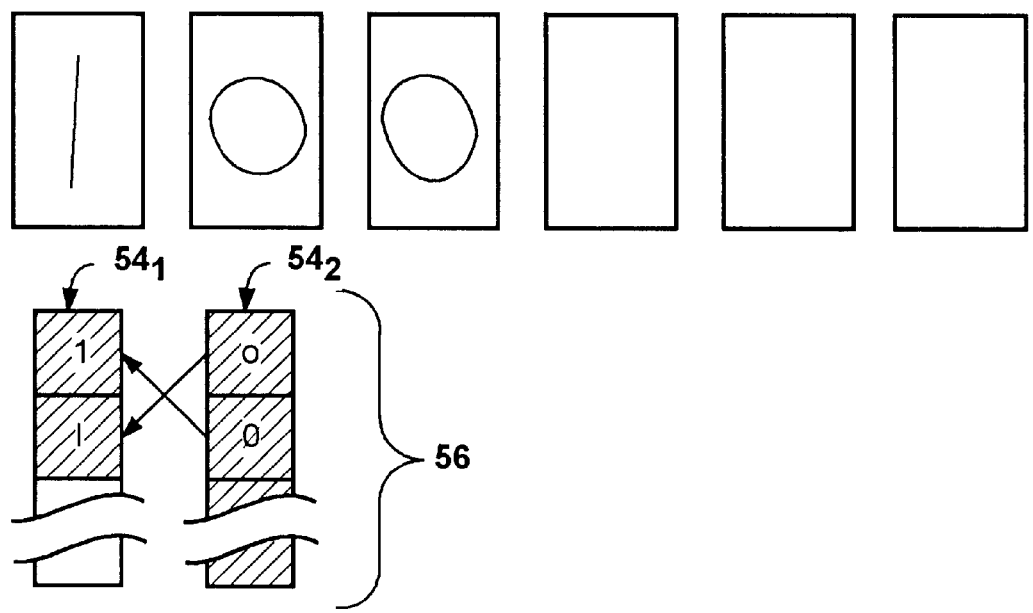
Figure 5D:
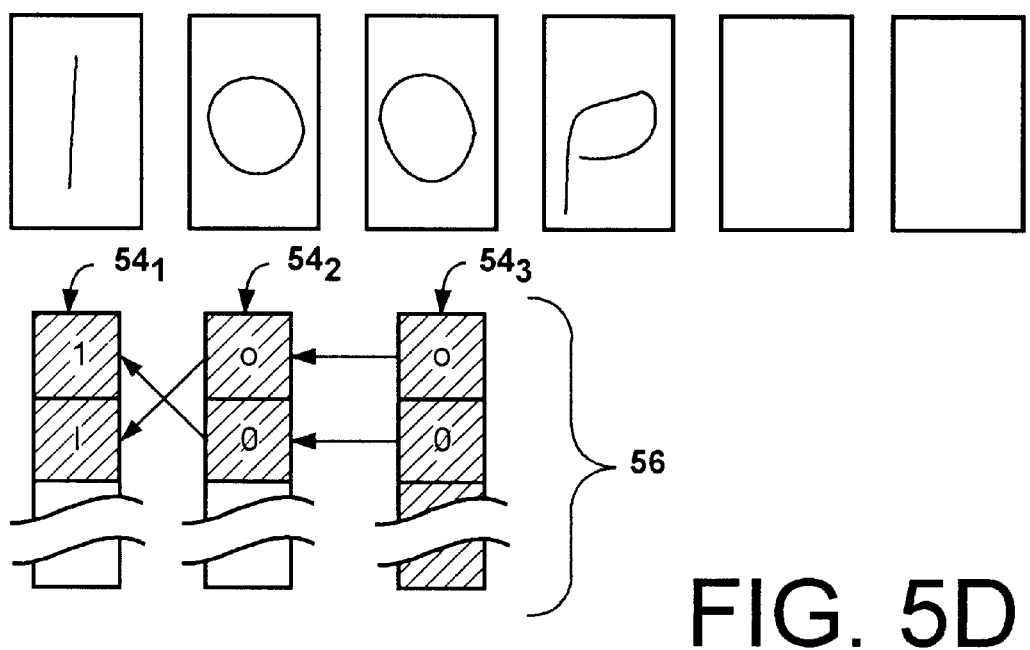
Figure 5E:
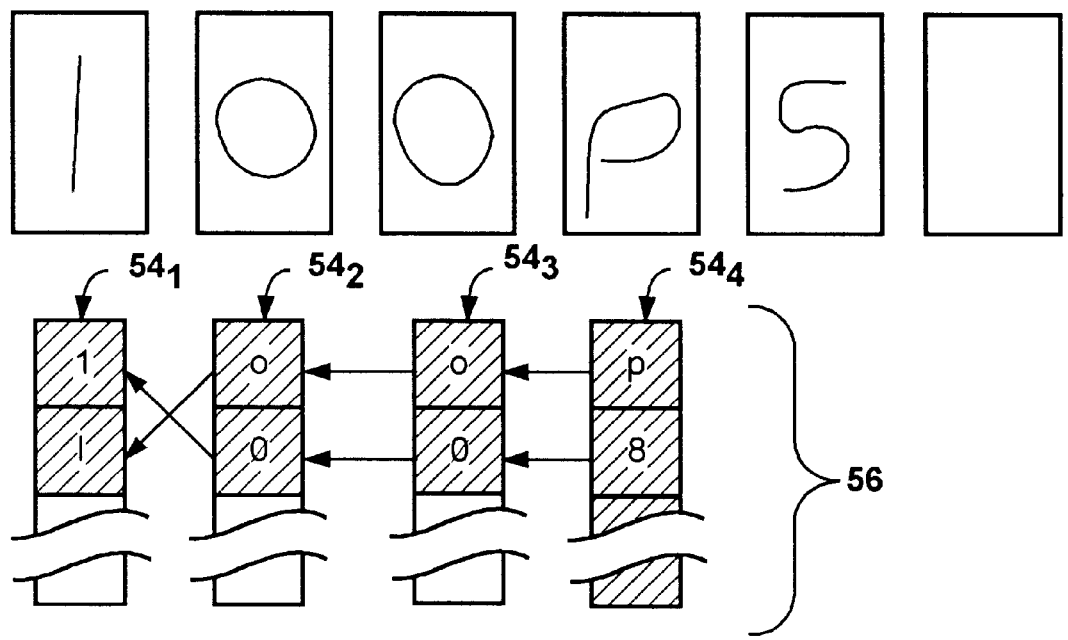
Figure 5F:
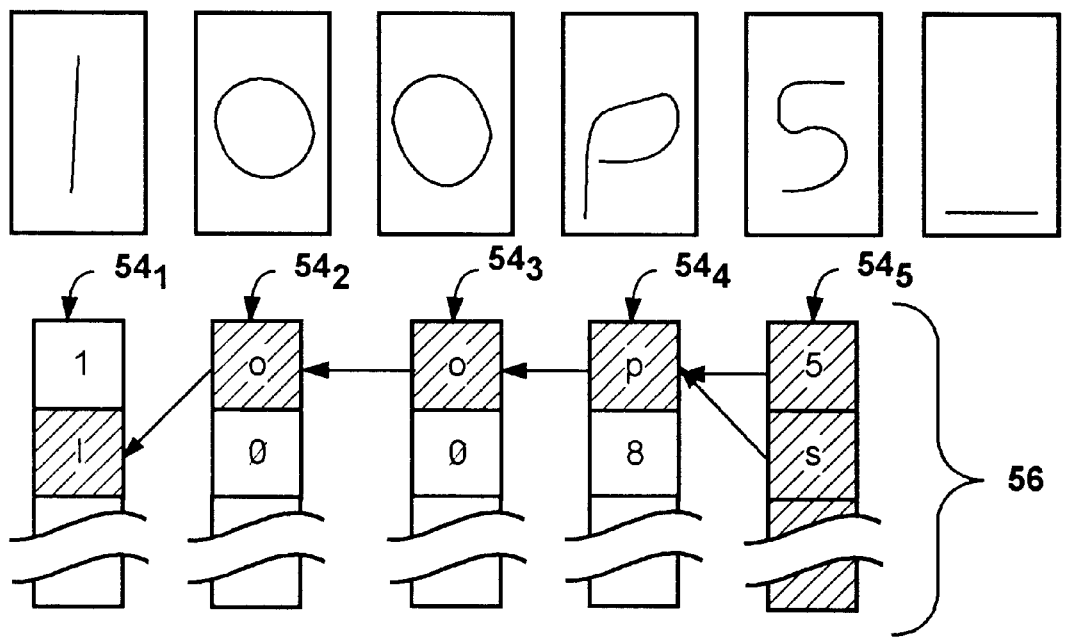
Figure 6:
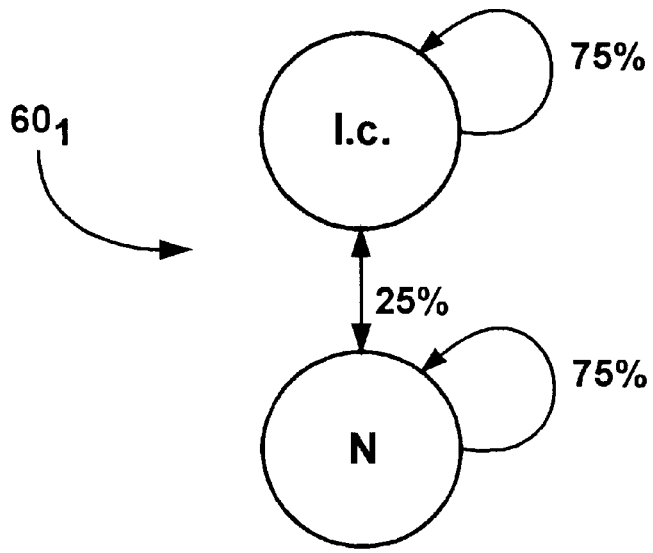
FIG. 6 is a representation of a simplified state machine used to perform context recognition on the characters of FIGS. 5A–5F.
Figure 8A:
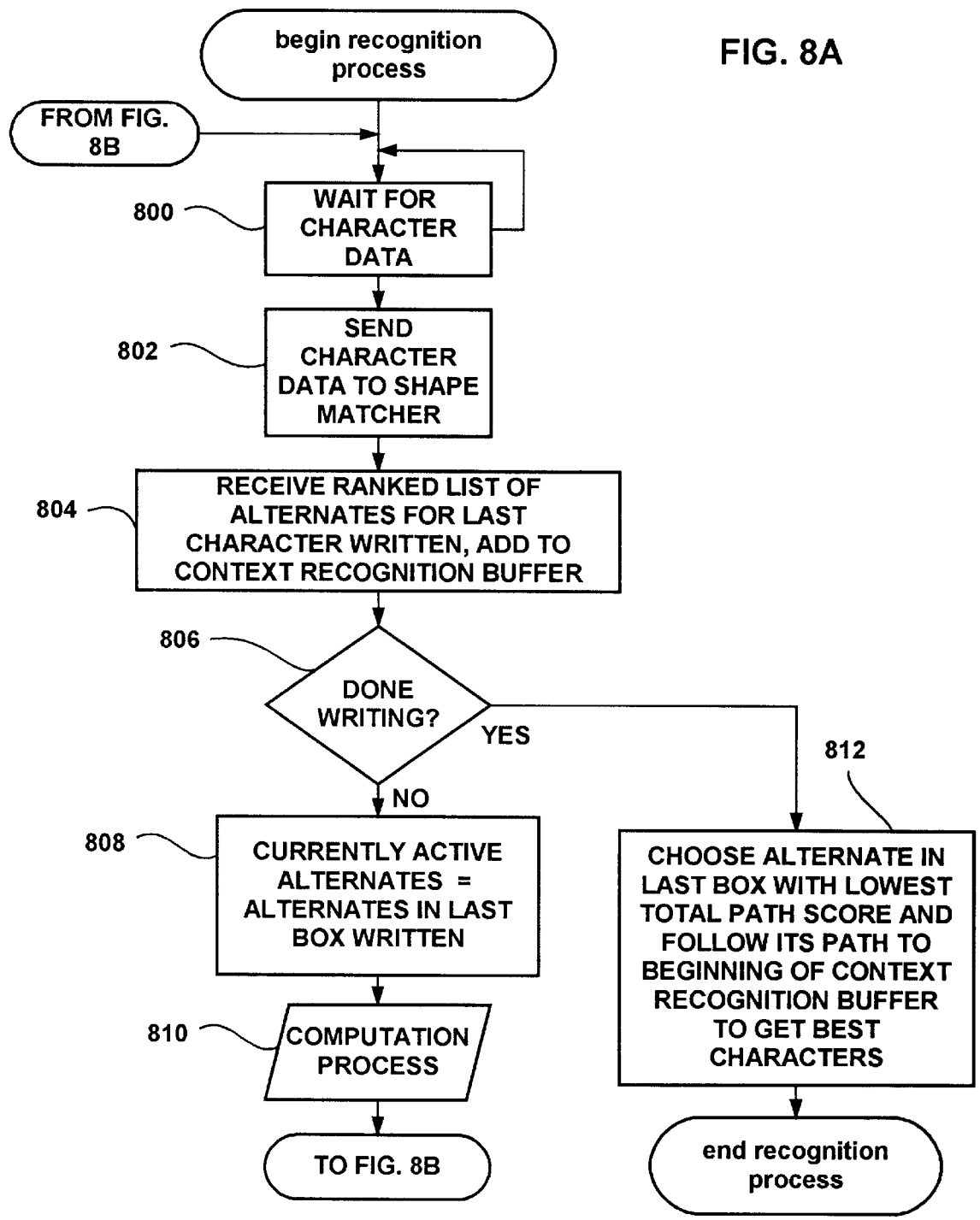

Turning to an explanation of the invention with particular reference to FIGS. 5A–5F and the flow diagram of FIGS. 8A–8B, in the following example, the user intends to input the string "loops_" into the system by writing into the input boxes 42–44 as described above. For purposes of readability, FIGS. 5A–5F show the characters as they are added to the system, (e.g., the user has just begun writing in the next box), and with the underscore character in FIG. 5F representing a space character. Also, for purposes of simplicity, in this example, the simplified state machine 60₁ represented in FIG. 6 is used to determine transition costs, with only lowercase letters (including the space character) and numerical digits zero through nine allowed. According to the rules of the simplified state machine 60₁, the set of lowercase letters, represented by an "l.c." in FIG. 6, have a seventy-five percent chance of being followed by another lowercase letter and a twenty-five percent chance of being followed by a number. The set of numbers, represented by an "N" in FIG. 6, have a seventy-five percent chance of being followed by another number and a twenty-five percent chance of being followed by a letter. Of course, it is understood that more complex state machines based on various language models or the like may be used to determine transition costs in actual systems.

As described above, the system considers a character to be entered when the user begins writing in another box, stops writing for a sufficiently long period of time (times out), or directly commands the system to enter the character. Thus, the recognition process 48 begins when an input character's data is received at step 800 (FIG. 8), as shown in FIG. 5A (wherein the user has just begun to write in another box). At step 802, the recognition process 48 passes the character information (e.g., coordinates representing the strokes, a bitmap or some other appropriate format) to the shape matcher 50 for recognition thereof. As shown in FIG. 5B, at step 804, the shape matcher 50 returns a ranked list of alternates $54_1$, and the ranked list $54_1$ is appended to the (currently empty) context recognition buffer 56. In the present example, as shown in FIG. 5B, for the vertical stroke entered by the user, the two top alternatives are a one ("1") and a lowercase letter-L ("l"), each having a forty-nine percent probability, or alternatively, cost=−ln(0.49)=0.7133. Other character alternates, such as an "i" (assumed undotted) and a "t" (uncrossed) may be also returned with much lower probabilities but are not separately shown.

At step 806, since the user is writing in another box, (e.g., input box 43), the process determines that the user is not done writing, an act which would force the end of the recognition process as described below. For now, the process 48 continues to step 808. At step 808, a set of currently active alternates are established as all of the alternates returned in the list $54_1$ (by the shape matcher 50) for the last character written, the vertical stroke. (Step 810, described below, is a computation process for determining the lowest cost paths between alternates of adjacent entries, but since this is the first entry, the only cost is the cost of each alternate at this time.) The process thus continues to step 820 (FIG. 8B) to test if the number of active alternates in the current set is one. Since the shape matcher 50 has returned more than one alternate for this first character, all of which are active, the process continues to step 822.

Step 822 tests to determine if the current set of active alternates belongs to the first character in the context recognition buffer 56. At this time, this is true, so step 822 returns to step 800 (FIG. 8A) to await the next handwritten character.

As shown in FIG. 5B, sometime later the user begins to write another character in a third box, having completed the circular-shaped character in the second box. Accordingly, the circular-shaped character information is received at step 800, and sent to the shape matcher at step 802. As shown in FIG. 5C, a list of alternates $54_2$, including a lowercase "o" and a zero ("0") are returned and placed in the context recognition buffer 56 at step 804, the zero shown with a slash therethrough in FIG. 5C. Both choices again have forty-nine percent probabilities, or alternatively, cost=−ln(0.49)= 0.7133.

Figure 7:
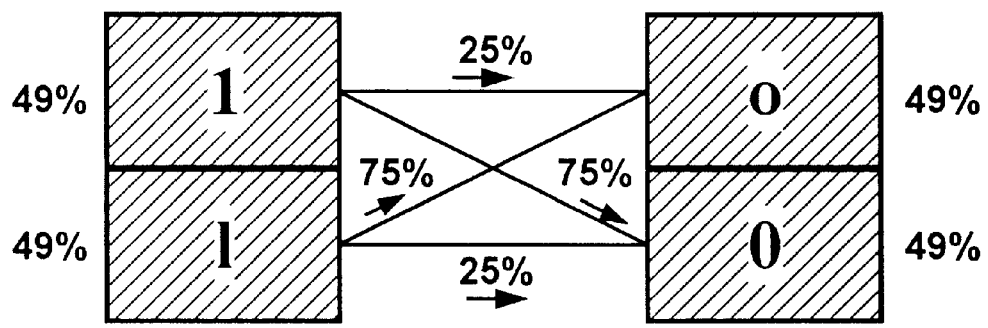
FIG. 7 is a representation of a lattice of alternative paths and showing cost information of some of the paths for the buffered alternative characters of FIG. 5C.

Step 806 again tests to determine if the user is done writing, and since the user is still writing, the process continues to step 808. At step 808, the currently active alternates are the alternates of the last box written, i.e., the "o" and the "0" (plus others, not separately shown). Then, at step 810, the context recognition process 48 uses the state machine $60_1$, along with the costs returned by the shape matcher with each alternate, to compute and determine the lowest cost path from the previous to each of the alternates returned for the last written (circular shaped) character. FIG. 7 shows the lattice of paths and the cost information for the paths, shown as percentage probabilities for comparative readability purposes. For additional clarity, the following table sets forth the transition costs for this lattice (with lowercase "l" shown as a capital and the numbers written out to avoid confusion) based on the state machine $60_1$ of FIG. 6:

| Transition | Percent Likelihood | Cost [−ln(%)] |
|---|---|---|
| L to o | 75 | 0.2877 |
| L to zero | 25 | 1.3863 |
| One to o | 25 | 1.3863 |
| One to zero | 75 | 0.2877 |

In keeping with the invention, as described above, the context computation process 60 (Viterbi algorithm) is used at step 810 to determine the lowest cost paths to the alternates of the last written character by summing the costs. As apparent from an analysis of FIG. 7 and as shown in FIG. 5C, backpointers from the zero ("0") to the one ("1") and from the "o" to the "l" show the results of the computation. The process 48 then continues to step 820 of FIG. 8B.

Since there are at least these two alternates, step 820 of FIG. 8B branches to step 822, wherein it is determined that the list $54_2$ does not represent the first character in the context recognition buffer 56. As a result, step 822 branches to step 824 where the currently active alternates are changed to alternates representing the previous character that are active (have backpointers thereto), i.e., the one ("1") and the "l" in the list $54_1$. Note that in the present example, each of the alternates in the list $54_2$ that are not separately shown also have to point to either the one ("1") alternate or the "l" alternate. This is because of the low cost of these top two alternates relative to the possible transition costs under the rules of the state machine $60_1$.

The process then returns to step 820 with the new set of currently active alternates, wherein it is determined that more than one alternate is active in the list $54_1$. Accordingly, step 820 branches to step 822 where this time it is determined that the set of currently active alternates belong to the list representing the first character in the context recognition buffer 56. Step 822 thus returns to step 800 of FIG. 8A.

The next character, another circular-shaped entry, is handled in substantially the same manner as was the previous character. Thus, assuming at step 804 that the shape matcher returns approximately the same probabilities, the "o" alternate in the list $54_3$ (FIG. 5D) is assigned a backpointer to the "o" alternate in the list $54_2$, and the zero ("0") in the list $54_3$ a backpointer to the alternate in the list $54_2$. As is apparent from FIG. 5D, for each loop through steps 820–824, step 820 again fails to detect any list with only one active alternate therein before the first character is reached at step 822.

The next entered character, however, the lowercase "p" character, begins to change the context in a way that will ultimately decide the characters in the string. More particularly, the "p" character in the list $54_4$ receives a high probability, such as ninety-five percent (i.e., low cost, equal to 0.0513), while the other characters such as the "8" receive a much lower probability, such as four percent (cost equals 3.2189). However, this time through the recognition process 48, the cost for all of the alternates for the last written character are computed at step 810, with a backpointer assigned to each as shown in FIG. 5E. Thus, although the "8" is unlikely, at this time it is still considered a viable possibility, and thus according the rules of the state machine $60_1$, the backpointer from the "8" points to the previous character's zero ("0") alternate.

Finally, the user completes the next, s-shaped character and begins another character (by causing a space character to be entered in some manner) as shown in FIG. 5F. At step 802, the s-shaped character is sent to the shape matcher 50. As shown in FIG. 5F, a "5" and an "s" is returned at step 804 with some cost assigned to each, along with other alternates in the list $54_5$. Again, in the present example the user is not finished writing at step 806, and thus at step 808 the currently active alternates are the "5" and the "s" (plus others, not separately shown) of the list $54_5$.

At step 810, because of the low cost of the "p," the cost from the "5" to the "p" is still lower than from the "5" to the "8," notwithstanding the transition cost differential from the state machine 601. In other words, using the numbers stated above, 95 percent times 25 percent is greater than 4 percent times 75 percent, and thus the backpointer from the "5" is to the preceding "p" alternate instead of the preceding "8" alternate. As can be appreciated, this is true of any other alternates not separately shown.

Once the backpointers have been computed at step 810, the process continues to step 820 of FIG. 8B. At step 820, because there are at least these two alternates, the process branches to step 822. Step 822 determines that this is not the first character in the context recognition buffer 56, and thus continues to step 824 where the currently active alternate set is changed to point to the "p" alternate in the previous list of alternates. Note that only the "p" alternate is placed in the set because only the "p" alternate is active, i.e., has a backpointer thereto.

As a result, step 820 determines that the number of currently active alternate is now one, and thus branches to step 826. At step 826, the sole currently active alternate, the "p" alternate, is placed along with its preceding alternates on its lowest cost backpath (i.e., "loops") into the recognized character buffer 38. Then, at step 828, the lists $54_1$–$54_4$ corresponding to these now-recognized characters are removed from the context recognition buffer 56 whereby, the list $54_5$ containing the "5" and the "s" alternates becomes the first entry in the context recognition buffer 56.

As can be appreciated, the above-described process thus places partial results into the recognized character buffer 38 as soon as available, yet uses a full context recognition process that is as accurate as waiting for an entire string to be completed before analysis thereof. Although the string "loop" was somewhat of an extreme example chosen to show the advantages over backwards-only recognition, in practice it has been found that one to three characters are ordinarily all that are needed by the process of the present invention before the backpointers converge to a common alternate. This provides acceptably rapid visual feedback along with the improved accuracy of full context recognition, while requiring only a small amount of memory for electronic ink. Significantly, once recognized with the above process, characters are not later changed regardless of further characters input into the string.

Lastly, when the user has finished writing, step 806 will detect that there are no more characters forthcoming from which forward context recognition can be accomplished. At such a time, the process 48 branches to step 812 to find the lowest-cost path back in order to determine the best characters of those remaining. Note that step 812 is just the conventional use of the Viterbi algorithm, used as if the remaining string was the full string entered all-at-once for recognition.

The above-described simplified state machine has the properties that every state is connected to every other state and any given code point always transitions to the same state regardless of the state in which it started. Any digit always goes to the digit state and any letter always goes to the letter state. In such an instance, the code point always uniquely determines the state, so there is no need to store the state separately. Moreover, all of the states are in a valid state. As can be appreciated, the simplified machine is a bigram state transition machine, which has one state per character in the alphabet, each state is connected to every other state (including itself). A slightly more complex bigram state machine is arranged as a table having transition costs corresponding to the probability of letter bigrams implied by the states, i.e., the cost to transition from "a" to "b" is the probability of seeing an "ab" bigram in normal text. The shape matcher returns a list of code point, score pairs. The set of lists maintained by the context recognition process (engine) is actually a list of triples, i.e., code point, score, state, along with a backpointer.

However, more complex state machines which implement language models are often desirable, such as a trie-structured dictionary state machine, or a nondeterministic state machine. With a dictionary state machine, the same letter has different states depending on what letters have come before. Moreover, most states only allow transition on a few letters. For example, only a "u" is a valid transition from the "q" state.

To accomplish context recognition in accordance with the present invention using more complex state machines, as before, for each box of ink the shape matcher returns a list of alternates which is made up character code points with associated probabilities. The context recognition process (i.e., context engine) takes this list of alternatives, and for each alternative, generates a list of all language model states that could be transitioned to with this character from the previous list of language model states. The language model states correspond to different paths through the character alternate arrays that are valid character transitions in the language model. The context recognition process computes the total path score for each of the new language model states by summing the cost of the character alternative assigned by the shape matcher with the cost of the transition from the previous language model state to the current language model state.

Figure 9:
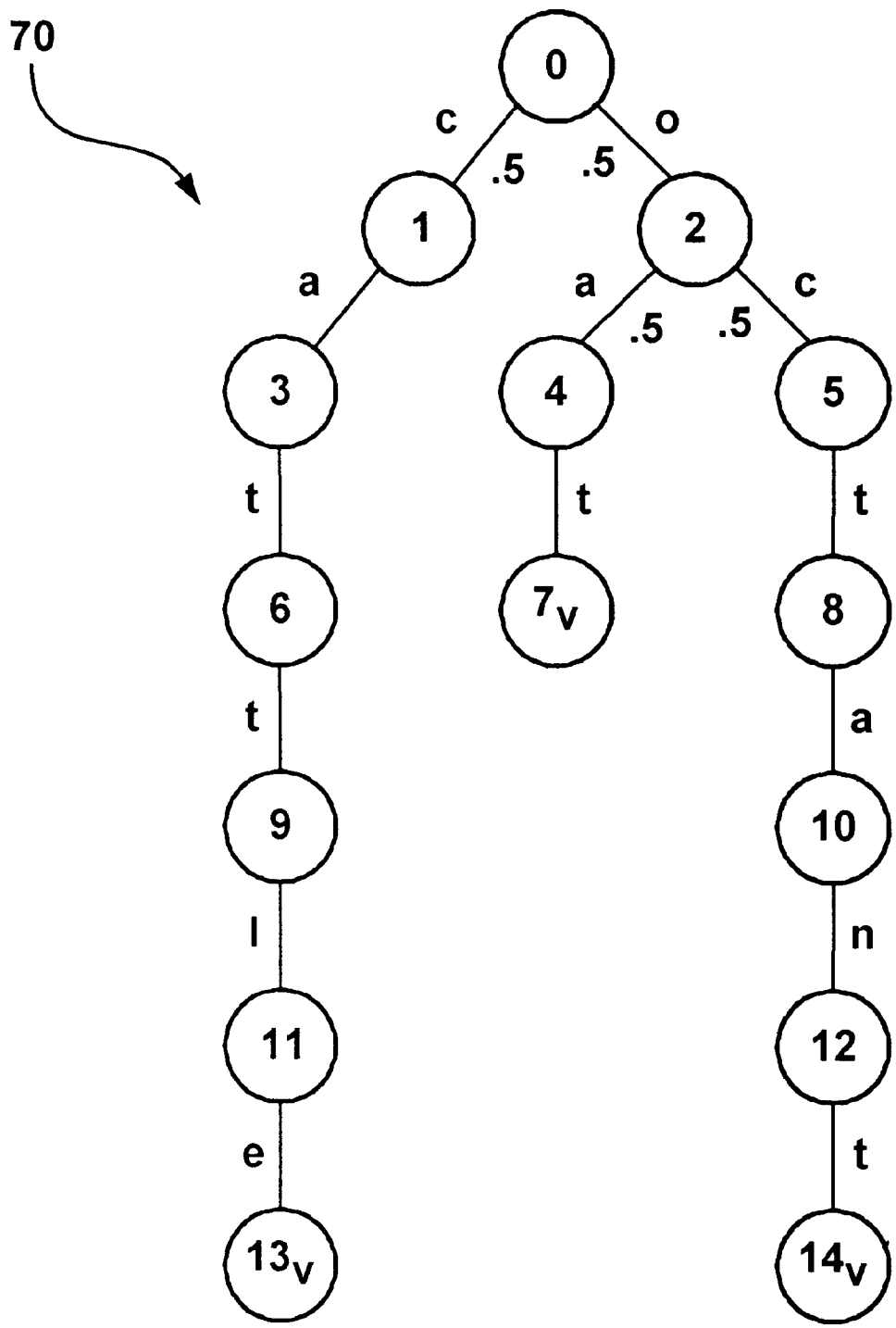
FIG. 9 is a representation of a dictionary state machine used to perform context recognition.
Figure 10:
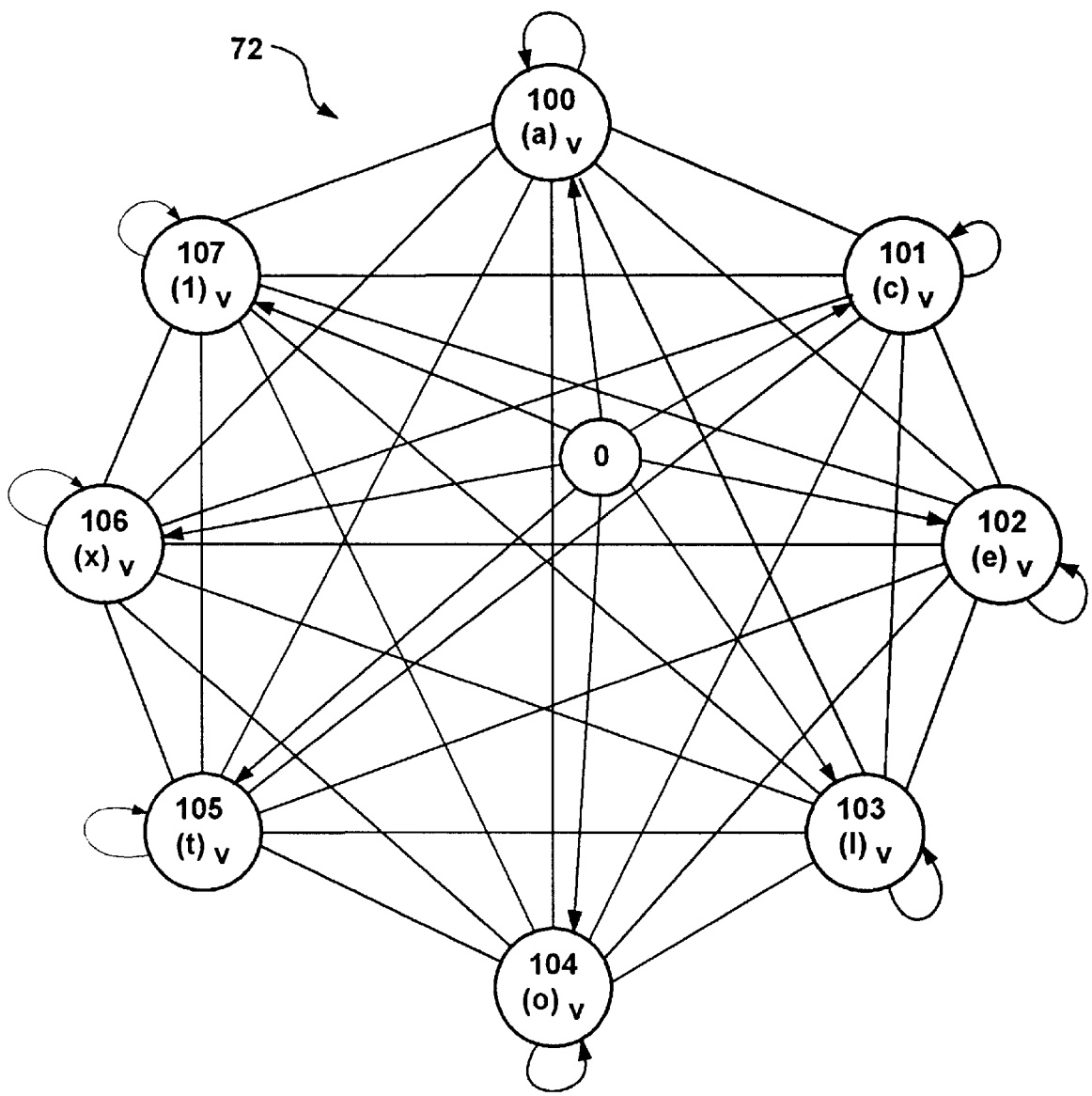
FIG. 10 is a representation of a bigram state machine used to perform context recognition.
Figure 11:
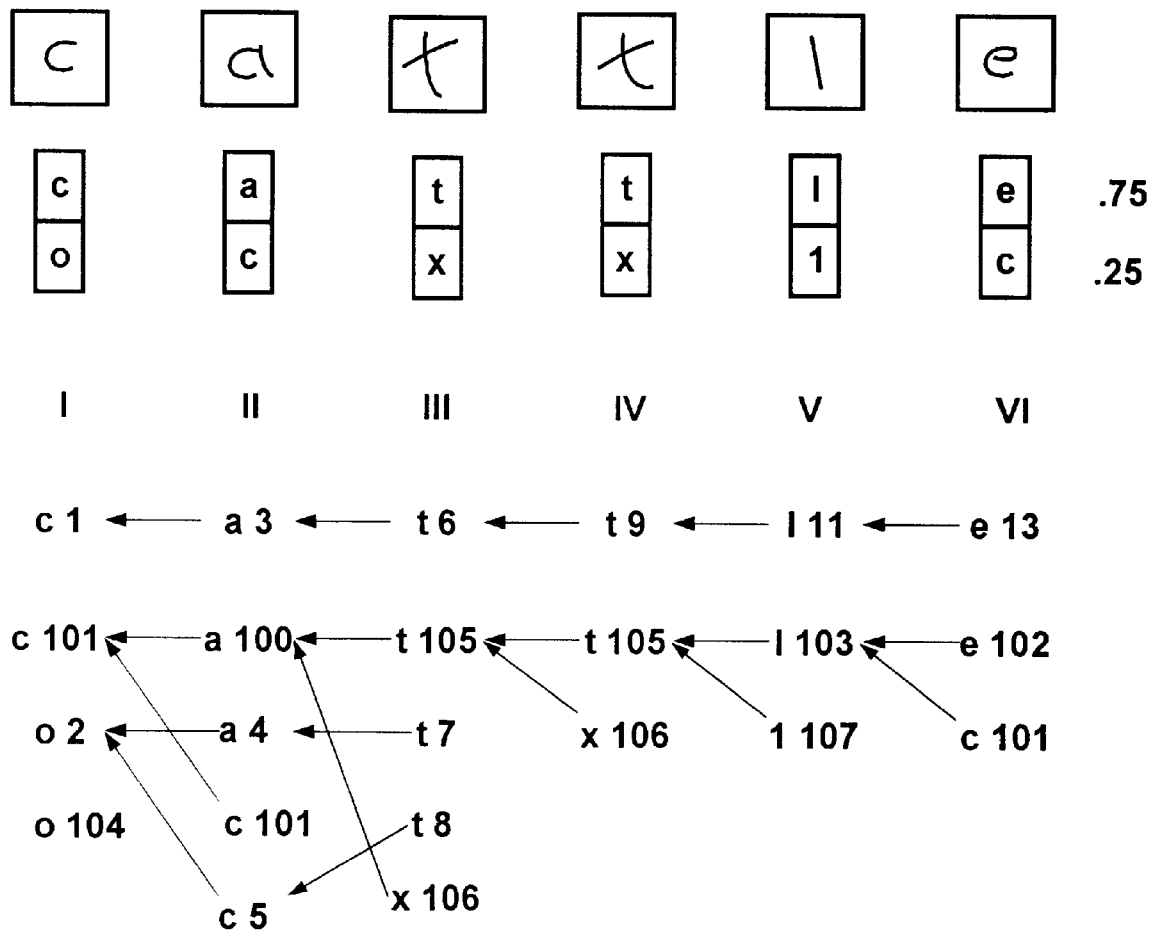
FIG. 11 is a representation of a lattice of alternative paths resulting from the state machines of FIGS. 9 and 10.

By way of example, the user is inputting the word "cattle" in lowercase as shown in FIG. 11. For purposes of simplicity, in the present example, as shown in FIG. 11, only two character alternatives are returned for each written box, the top choice having a seventy-five percent probability associated therewith, and the bottom choice a twenty-five percent probability. FIG. 9 shows a simplified dictionary state machine 70 having only three words therein which are relevant to the following example, i.e., "cattle", "oat" and "octant". Note that the "v" shown in states 13, 7 and 14 indicate a valid end of a word (termination) as described below. FIG. 10 shows a simplified eight-character bigram state machine 72 that will also be used in the present language model example, with the character for transitioning to each state shown as a character in parentheses within the numbered state. The bigram state machine 72 starts with a low probability such as one percent, corresponding to the fact that most words (ninety-nine percent) are expected to be in the dictionary 70. This means that the process selects a dictionary word if one is reasonable, but still can select a non-dictionary word. Note that more than one such state machine is included so that the user is not limited to writing only dictionary words, otherwise as will become apparent below, all paths would be pruned whenever a word was not in the dictionary. Indeed, a bigram state machine, such as 72 with each state being valid to terminate an input string, (and thus which cannot fail), is ordinarily provided for this purpose.

To integrate other state machines with the dictionary state machine, the context recognition uses the language model state alternative generating process mentioned above, e.g., on the first character box, every code point in the first box's ranked list of codepoint alternatives is used to generate the list of language model states that could be transitioned to. For this example each code point alternative generates two language model state alternatives, with the one at the top pointing to the dictionary 70 and the one at the bottom pointing to the bigram state machine 72. Note that since the same character can transition to two different language model states at the same time, this is the same as creating a single nondeterministic state machine from the combination of the various state machines.

Nondeterministic state machines are described by Knuth, *The Art of Computer Programming*, Addison-Wesley (1973).

Note that both state machines 70, 72 share a common initial start state, indicated by the zero state in both FIGS. 9 and 10. Thus, in the present example, four initial language model state alternatives are created from the first box's proposed codepoint alternatives of "c" and "o" that were returned, with a list of quadruples maintained for each language model state alternative generated that includes the code point, state, cost and a backpointer.

At this time, the quadruples are [c, 1, (0.75*0.99*0.5), NUL]; [c, 101, (0.75*0.01*0.125), NUL]; [o, 2, (0.25*0.99*0.5), NUL]; [o, 104, (0.25*0.01*0.125), NUL]. The costs are shown as probabilities and are determined by the probability of the code point (0.75 for "c" and 0.25 for "o"), times the cost of the state machine (0.99 for the dictionary 70, 0.01 for the bigram 72), times the cost of the transition from the initial state (0.5 in the dictionary since two possible branches exist and 0.125 in the bigram since eight possible branches exist). Note that in actual state machines, many more branches would exist and the probabilities assigned to each would sum to one, but not necessarily be equal, e.g., the chance of the first character in a word within a dictionary beginning with an "s" is much greater than a word beginning with an "x." Dictionary states are generally named after prefixes, and thus the "c" is in the "c" state and the "o" is in the "o" state with respect to the dictionary. Note that in a full dictionary trie, these are 32-bit indexes into a table, and not actually strings. When the code point alternate list for the next ink box is returned, i.e., the "a" (0.75 chance) and the "c" (0.25 chance), the context recognition process generates the language model state alternatives that can be transitioned to from the previous box's four language model state alternates via the two code point alternates returned in the alternate list. The two code point alternatives thus generate as many as eight language model states in this example. However, based on the state machine 70, not all of these eight state machine alternatives are viable. More particularly, as shown in FIG. 9, with respect to the dictionary 70, the previous "c" can transition to the "a", and the previous "o" to either the "a" or a "c" alternates, but the dictionary state machine 70 does not allow for the previous "c" to transition to another "c". This eliminates the potential quadruple therefor from the list. Moreover, some of the states in the language model state alternate list for this character box are duplicates. As the Viterbi algorithm is being used to find the lowest cost path through the language model states, it is evident to one familiar with the Viterbi algorithm that only the lowest cost path to a state needs to be kept.

In each such duplicate instance, the highest cost (lowest probability) duplicates are pruned, whereby the character that made the transition with the lowest cost path to a previous state is kept. The search for duplicates and their removal is preferable done as the list is built, thus dynamically pruning the number of paths.

In the present example, the quadruples for the second box are [a, 3, (0.75*0.75*0.99*0.5), →c,1], [a, 100, (0.75*0.75*0.01*0.125*0.125), →c,101], [a, 4, (0.25*0.75*0.99*0.5*0.5), →o,2], [a, 100, (0.25*0.75*0.01*0.125*0.125), →o,104], [c, 101, (0.25*0.75*0.01*0.125*0.125), →c,101], [c, 5, (0.25*0.25*0.99*0.5*0.5), →o,2], and [c, 101, (0.25*0.25*0.01*0.125*0.125), →o,104], where the "→" represents a backpointer to a previous (code point alternate, state) pair. As is apparent, there are duplicate (a, 100) and (c, 101) states, (it is irrelevant that the character transitions are also identical), and as described above, only the lowest cost (highest probabilities) of these are kept. Thus, the fourth and seventh of the above listed seven quadruples are removed. FIG. 11 shows the remaining code points, states and backpointers, at this time only looking back from Roman numerals II to I. For now, it should be noted that the backpointers from the second alternates are to two distinct characters, "c" and "o", and thus for now no partial results may be displayed. The display of partial results will be described below at the time in the example that such partial results are capable of being safely displayed.

The next character entered is either a "t" (75% probability) or an "x" (25% probability). From the dictionary state machine 70, states 3, 4 and 5 can all transition via a "t" to states 6, 7 and 8, respectively, while from the bigram state machine 72, states 100 and 101 can transition to state 105 via a "t". However, in the dictionary 70, none of the states 3, 4 or 5 can validly transition to another state via the "x" alternate, and thus these dictionary "x" quadruples drop out. The "x" is a valid bigram transition, of course, from state 100 to state 106 and state 101 to state 106. The valid quadruples, this time shown without values for probabilities (which can be determined as described above) for purposes of simplicity, are thus [t, 6, (PROB), →a,3]; [t, 105, (PROB), →a,100]; [t, 7, (PROB), →a,4]; [t, 105, (PROB), →c,101]; [t, 8, (PROB), →a,5]; [x, 106, (PROB), →a,100] and [x, 106, (PROB), →c,101]. By evaluating the costs, the latter of the two (t, 105) duplicates and the latter of the two (x, 106) duplicates are the lower probability duplicates of each, and thus removed, whereby at this time, the remaining code point alternates, states, and backpointers are as shown in FIG. 11 from Roman numeral III back to Roman numeral I. Again, it should be noted for now that the backpointers from any state on back are to at least two distinct characters, and thus no partial results may be safely displayed at this time.

Following the above explanation, it should be apparent that the next (fourth) character entered, which also has a "t" and "x" returned as alternates therefor, have only three quadruples after excluding invalid transitions and removing duplicates. These remaining quadruples, shown without values for their probabilities, are [t, 9, (PROB), →t,6]; [t, 105, (PROB), →t,105]; and [x, 106, (PROB), →t,105]. Note that this is because there was no valid "t" or "x" transition from state 7 or 8 to another state in the dictionary 70, and no valid "x" transition from state 6. Moreover, the lowest costs duplicates in the bigram state machine 72 were for the t, 105 state that had a backpointer to the t, 105 state and the x, 106 state that had a backpointer to the t, 105 state, and thus the higher cost (i.e., lower probability) duplicates were removed. The code points, states and backpointers thus appear as in FIG. 11 from Roman numeral IV back to Roman numeral I. In keeping with the present invention, the algorithm that determines which characters can be displayed safely is modified to search backwards through the queue of language model states for each character box, until all the still active language model states for an ink box have converged to the same proposed alternate character. Note that this does not mean the paths must converge, (since each state machine will have its own path, if any, pointing to its own state), but that any remaining paths represent the same character. At present in the case that the language model is a non-deterministic state machine, the algorithm includes a rule, stating that the requirement that all the paths represent the same character has to hold for all ink boxes back to the first ink box written to safely display the character alternate. For example, if the only two active paths left were for "paternal" and "pottery," it would appear that at the third letter "t" the paths have merged for the same character. However, the characters are not the same all the way back to the first "p" character, and thus these first three characters in the string are not considered safely recognized.

In the present example, however, the backpointers from the fourth character alternates (IV) are to a common character, "t", either via a (t, 6) or a (t, 105). In turn, each of these "t" backpointers are to an "a" character, which in turn are to a "c" character. As a result, even though on different paths, the first three characters, "cat" can be safely written to the recognized character (text) buffer 38 for displaying to the user.

When the inking process is completed, and completion of the recognition is forced by a time out or the user hitting the recognize button, a final symbol "end" is generated. Only those states that can transition to the end state on "end" are considered valid. For example, if the user hit "recognize" after entering only "catt," the states for the dictionary path would be discarded since the state numbered 9 is not a valid termination point. States which are valid termination points are marked as such such as by having a specific bit set therein. As can be appreciated, if all dictionary states are discarded, in the present example only bigram states would remain. In this manner, even with the low-probability (one percent) assigned to bigram states, the bigram states may become the ones used for context recognition. Note however, that the "cat" string, which was already written to the text buffer, is not changed by this termination regardless of which path is used.

As can be appreciated, implementing this search allows a sophisticated language model made up of state machines, of which some of the state machines may be dictionaries organized as state machines (trie state machine in the present implementation). This enables a dictionary search with forward and backward context, while providing partial results that cannot be changed by further input.

In addition, using this technique, other state machines can be added. For example, a special state machine for numbers can be added, such as one which knows about commas, currency symbols, and decimal points. Another state machine for computer file names, or Internet URLs can be added. Significantly, a user may add a personal supplementary dictionary of private words. Moreover, other considerations are handled wherein the context recognition process creates a list of language model state entries from the ranked code point list provided by the shape matcher. A first consideration is when the same character can go to more than one state in the same state machine. For example, this happens with upper and lower case letters, i.e., most words are valid in all lower case (e.g., "word"), with an initial capital, (e.g., "Word") and in all capitals, (e.g., "WORD"). Other variations are prohibited, e.g., "wOrD"). Second, some words need to be capitalized, (e.g., "Florida" or "FLORIDA", but not "florida"), and a few are always all capitalized (e.g., "USA"). Of course, in the computer, a capital 'F' and a lower-case 'f' are different letters, so if the first letter is 'F' the context engine needs to match that to both the "f" state and the "F" state. The dictionary state machine itself is slightly augmented to make this work, i.e., it "remembers" whether it has capitalized any letters or not. As can be appreciated by one skilled in the art, this is easily done by adding an appropriate number of bits to the state number, which is equivalent to creating a dictionary state machine with many more states to represent all the states a word can be in.

A third consideration for which the context recognition process creates multiple language model state entries from a single code point in the shape matchers alternate list is when there is more than one state machine, as described above. This usually happens only at the beginning of input, but it can also happen (for example) when a hyphen, dash, slash, or space is encountered. Because it is important that there be at least one valid state machine for any input, the bigram state machine is used, via which, at the beginning of input, each element in the first ranked list gets a bigram state and a dictionary state. It is also useful to also include state machines for currency amounts, file names, Internet URLs, and so on.

To this end, the dictionary itself may be nondeterministic, to handle compound forms, e.g., words or terms containing a space, (such as "habeus corpus"), a hyphen (such as "T-shirt") or a slash (such as "I/O"). Normally, any two dictionary words separated by space, hyphen, or slash are allowed, but it is even more desirable in certain instances to allow a non-dictionary word only when it is part of such a compound. This is accomplished by adding the compound form (including the space, dash, slash and so on) to the dictionary and then letting the context recognition process split each character in the next ranked list, i.e., one going back to the initial dictionary state and the other continuing from the space, dash, or slash. For example, with "I/O", the "I" is acceptable by itself, but the "O" is probably not, whereby the form "I/O" is added.

Lastly, although the described embodiment uses characters written in boxes, it will be apparent to one skilled in the art that this algorithm also works for the unconstrained case. It can be readily appreciated that in the unconstrained case, some of the arrows (backpointers) will point back two or more columns rather than always pointing to the immediately previous column of alternates.

As can be seen from the foregoing detailed description, there is provided an improved method and mechanism for performing full-context recognition. The full context recognition method and mechanism enables rapid visual feedback while having relatively low memory requirements. The method and mechanism function with existing recognition components such as shape matching components and language model context components, and is fast, reliable, cost-efficient, flexible and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for recognizing a handwritten character previously input into a computer system when another character has been input into the system thereafter, comprising the steps of:
receiving a plurality of current alternates corresponding to a latest handwritten character, each of the current alternates having information associated therewith corresponding to a probability, and after each latest handwritten character is received:
determining a cost from each of the current alternates to each of the previous alternates of a previously input handwritten character, the cost based on probability information of each previous alternate, probability information of each current alternate and a transition cost therebetween;
determining a lowest cost from each of the current alternates to one of the previous alternates, and,
if the lowest cost of each of the current alternates is to a common previous alternate, recognizing the common previous alternate as a code point for the previous character.

2. The method of claim 1 wherein the step of recognizing the common previous alternate as a code point for the previous character further comprises the steps of determining the lowest cost path back from the common previous alternate to a preceding alternate thereof and recognizing the preceding alternate as a code point.

3. The method of claim 1 wherein the step of determining the lowest cost from each of the current alternates to one of the previous alternates includes the step of saving a backpointer pointing from each of the current alternates to the previous alternate having the lowest cost path thereto.

4. The method of claim 3, wherein if the lowest cost of each of the current alternates is not to a common previous alternate, further comprising the steps of, determining if an earlier set of preceding alternates representing an earlier character precedes the previous alternate, and if so, determining the lowest cost from each of the previous alternates having a backpointer thereto to one of the preceding alternates, and, if the lowest cost of each previous alternate having a backpointer thereto converges to a common preceding alternate thereof, recognizing the common preceding alternate as a code point for the earlier character.

5. The method of claim 4 wherein the step of recognizing the common preceding alternate as a code point for the earlier character further comprises the steps of, determining the lowest cost path back from the common preceding alternate to a still-earlier preceding alternate thereof, and recognizing the still-earlier preceding alternate as a code point.

6. The method of claim 1 wherein the step of recognizing the common previous alternate as a code point includes the step of displaying the code point.

7. The method of claim 1 wherein the step of receiving a plurality of current alternates corresponding to a latest handwritten character includes the steps of receiving information of the current handwritten character, passing the information to a shape matcher, and receiving a response from the shape matcher, the response including the alternates and the probability information associated with each alternate.

8. The method of claim 7 wherein a list of language model states is generated from the list of character alternates returned by the shape matcher, the list of language model states corresponding to different paths through the character alternates that are valid character transitions in a language model.

9. The method of claim 1 wherein the probability information is a negative natural log of a probability value, and the transition cost is a negative natural log of a probability value, and wherein the step of determining the cost from each of the current alternates to each of the previous alternates of a previously input handwritten character includes the step of summing the natural log values.

10. A mechanism for recognizing at least one handwritten character previously input into a computer system when another character has been input into the system thereafter, comprising:
means for receiving a set of a plurality of current alternates corresponding to a latest handwritten character, each of the current alternates having information associated therewith corresponding to a probability; and
a recognition mechanism operating as each set of current alternates is received to attempt to recognize based on the information associated with the current alternates at least one character that has been previously input into the computer system, the recognition mechanism including:
means for determining a cost from each of the current alternates to each of the previous alternates of a previously input handwritten character, the determination based on probability information of each previous alternate, probability information of each current alternate and a transition cost therebetween;
means for determining a lowest cost from each of the current alternates to one of the previous alternates,
means for detecting when the lowest cost of each of the current alternates is to a common previous alternate, and,
means for recognizing the common previous alternate as a code point for the previous character when the lowest cost of each of the current alternates is to a common previous alternate.

11. The mechanism of claim 10 wherein the means for recognizing the common previous alternate as a code point for the previous character further comprises means for determining the lowest cost path back from the common previous alternate to a preceding alternate thereof, and means for recognizing the preceding alternate as a code point.

12. The mechanism of claim 10 wherein the means for determining the lowest cost from each of the current alternates to one of the previous alternates includes means for saving a backpointer pointing from each of the current alternates to the previous alternate having the lowest cost path thereto.

13. The mechanism of claim 12 further comprising means for detecting when each of the current alternates is not to a common previous alternate, means for determining if an earlier set of preceding alternates representing an earlier character precedes the previous alternate, means for determining the lowest cost from each of the previous alternates having a backpointer thereto to one of the preceding alternates, and means for recognizing the common preceding alternate as a code point for the earlier character when the lowest cost of each previous alternate having a backpointer thereto converges to a common preceding alternate thereof.

14. The mechanism of claim 13 wherein the means for recognizing the common preceding alternate as a code point for the earlier character further comprises, means for determining the lowest cost path back from the common preceding alternate to a still-earlier preceding alternate thereof, and means for recognizing the still-earlier preceding alternate as a code point.

15. The mechanism of claim 10 wherein the means for recognizing the common previous alternate as a code point includes means for displaying the code point.

16. The mechanism of claim 10 wherein the means for receiving a plurality of current alternates corresponding to a latest handwritten character includes, means for receiving information of the current handwritten character, means for passing the information to a shape matcher, and means for receiving a response from the shape matcher, the response including the alternates and the probability information associated with each alternate.

17. The mechanism of claim 16 wherein a list of language model states is generated from the list of character alternates returned by the shape matcher, the list of language model states corresponding to different paths through the character alternates that are valid character transitions in a language model.

18. The mechanism of claim 10 wherein the probability information is a negative natural log of a probability value, and the transition cost is a negative natural log of a probability value, and wherein the means for determining the cost from each of the current alternates to each of the previous alternates of a previously input handwritten character includes means for summing the natural log values.

19. In a computer system, a method of recognizing at least one handwritten character entered into the system as subsequent handwritten characters are entered into the system, wherein each handwritten character is associated with a plurality of alternate code points therefor, with each alternate code point having probability information associated therewith, the method comprising the steps of, placing the alternate code points for each handwritten character entered at the end of a queue, and after each handwritten character is entered, determining a cost from each alternate in the queue to any immediately preceding alternate in the queue, the cost based on the probability information of the alternates and a transition cost therebetween, determining the lowest cost path back from each of the alternates at the end of the queue to an alternate at the beginning of the queue, and determining if each lowest cost path back converges at a common alternate in the queue, and if so, recognizing the common alternate and any alternates previous thereto on the path back as the code points for each of the handwritten characters associated therewith.

20. In a computer system, a method of recognizing at least one handwritten character entered into the system based on the context of a subsequent handwritten character entered into the system, comprising the steps of:

(a) receiving an entered handwritten character, and as each handwritten character is received:

(b) passing the handwritten character to a shape matcher and receiving a plurality of alternates therefor from the shape matcher, each alternate having a cost associated therewith corresponding to the likelihood of matching the character;

(c) identifying the received alternates as a set of currently active alternates;

(d) appending the alternates to a queue;

(e) determining if there is a previous set of alternates prior to the currently active alternates in the queue, and if not, returning to step (a);

(f) determining the cost from each of the currently active alternates to each of the alternates in the previous set of alternates, the determination based on the cost of each previous alternate, the cost of each currently active alternate and a transition cost therebetween;

(g) determining the lowest cost path from each of the currently active alternates to one of the previous alternates and associating a backpointer with each of the lowest cost paths;

(h) if the backpointers of each of the current alternates point to a common previous alternate,
   recognizing the common previous alternate as a code point for the previous character, following backpointers on a path from the common previous alternate through any earlier alternates thereof until the beginning of the queue is reached, recognizing each earlier alternate on the path as a code point for each earlier character, and returning to step (a); and (i) if the backpointers of each of the current alternates do not point to a common previous alternate,
   re-identifying the set of currently alternates as the previous alternates having backpointers thereto, and returning to step (e).

21. A system for recognizing hand written characters input thereto, comprising:

a shape matcher, the shape matcher providing a plurality of alternates for each hand written character input, each of the plurality of alternates having probability information associated therewith; and a context analyzer interfaced with the shape matcher to analyze shape information associated with at least one prior character with reference to a selected character and shape information associated with at least one subsequent character with reference to the selected character to recognize at least one hand written character before an entire character string has been input, the context analyzer recognizing at least one handwritten character based on the probability information and transition costs between the alternates.

22. The system of claim 21 further comprising a display for displaying images corresponding to recognized hand written characters.

23. The system of claim 21 wherein the context analyzer analyzes at least two paths back from at least two of the alternates of the selected character to at least one of the alternates of at least one prior character that has been previously input into the system to determine whether lowest cost paths back converge on a common alternate.

24. The system of claim 23 wherein if the lowest cost paths back converge on a common alternate, the system recognizes a code point based on the common alternate.

25. The system of claim 23 wherein if the lowest cost paths back converge on a common alternate, the system recognizes a code point based on the common alternate, and further recognizes a code point for each alternate on a lowest cost path back from the common alternate.

26. The system of claim 25 further comprising a display for displaying images corresponding to recognized code points.

27. A system for recognizing and outputting code points corresponding to hand written characters input thereto, comprising:

a shape matcher for providing shape information for each hand written character input, the shape information including a plurality of alternates and probability information for each alternate; and a context analyzer connected to the shape matcher to analyze the shape information associated with a selected character and the shape information associated with at least one prior character relative to the selected character, the context analyzer recognizing at least one hand written character before an entire character string has been input by analyzing at least two paths back from at least two of the alternates of the selected character to at least one of the alternates of at least one prior character that has been previously input into the system to determine when the paths converge on a common alternate based on the probability information and transition costs between the alternates, and outputting a code point based on the common alternate.

28. The system of claim 27 wherein the context analyzer further recognizes and outputs a code point for each alternate on a lowest cost path back from the common alternate.

29. The system of claim 27 further comprising a display connected to the context analyzer for displaying images corresponding to recognized code points output thereby.

30. A computer-readable medium having computer-executable instructions for performing steps comprising:
   maintaining a sequence of at least one set of alternates and any backpointers to the alternates in each set, each set of alternates corresponding to a previous handwritten character;
   receiving a new handwritten character as a current character, and as each current character is input into the system:
   (a) receiving a plurality of current alternates for the current handwritten character, each of the current alternates having information associated therewith corresponding to a probability;
   (b) determining a path cost from each of the current alternates to each of the alternates of a most-recent set in the sequence, each path cost based on the probability information of each current alternate, probability information of each alternate of the most-recent set, and a transition cost therebetween;
   (c) for each current alternate, determining which alternate of the most-recent set has a lowest path cost thereto, and providing a backpointer to that alternate;
   (d) selecting as a currently selected group each alternate of the most-recent set of alternates that has at least one backpointer thereto;
   (e) determining if the backpointers converge at a single alternate of the currently selected group, and if so,
      (i) recognizing the single alternate as a recognized code point; and
      (ii) determining if any sets precede the currently selected group in the sequence, and if so, for each preceding set, selecting the preceding set as the currently selected group, selecting as the single alternate the alternate having a backpointer from the alternate corresponding to the recognized code point, and repeating step (e)(i) until no sets precede the currently selected group;
   and if not:
      (iii) determining if any sets precede the currently selected group in the sequence, and if so, selecting the currently selected group as a formerly selected group, selecting as the currently selected group each alternate in the previous set of alternates that has at least one backpointer thereto from the formerly selected group, and returning to step (e).

31. The computer-readable medium of claim 30 wherein the step of recognizing the single alternate as a recognized code point includes the step of placing the code point into a recognition buffer.

32. The computer-readable medium of claim 31 having further computer-executable instructions for performing the step of displaying each code point in the recognition buffer.

33. The computer-readable medium of claim 30 having further computer-executable instructions for performing the step of removing from the sequence each set of alternates having a single alternate therein.

34. The computer-readable medium of claim 30 wherein if the step of determining if any sets precede the currently selected group in the sequence determines that none precede the currently selected group, the computer-readable medium having further computer-executable instructions for performing the step of awaiting receipt of another new handwritten character.

35. The computer-readable medium of claim 30 wherein if the step of determining if any sets precede the currently selected group in the sequence determines that none precede the currently selected group, the computer-readable medium having further computer-executable instructions for performing the step of awaiting receipt of another new handwritten character or receipt of a manual request to recognize.

* * * * *